(12) United States Patent
Noto

(10) Patent No.: US 6,360,694 B1
(45) Date of Patent: Mar. 26, 2002

(54) TOY FOR ANIMALS

(75) Inventor: Yasunori Noto, Fukuoka (JP)

(73) Assignee: Computer Convenience Inc., Fukoka (JP)

( * ) Notice: Subject to any disclaimer, the term of this patent is extended or adjusted under 35 U.S.C. 154(b) by 0 days.

(21) Appl. No.: 09/739,323

(22) Filed: Dec. 19, 2000

(30) Foreign Application Priority Data

Aug. 18, 2000 (JP) .................................. 2000-248361

(51) Int. Cl.⁷ .................................................. A01K 29/00
(52) U.S. Cl. ................................................................ 119/707
(58) Field of Search ................................ 119/702, 706, 119/707, 708, 709, 710, 711; 446/3, 236, 241, 259, 268, 260, 278, 330, 352; 473/137, 138, 139, 145, 146, 147, 149

(56) References Cited

U.S. PATENT DOCUMENTS

| | | | |
|---|---|---|---|
| 2,673,087 A | * | 3/1954 | Bacon |
| 3,124,958 A | * | 3/1964 | McDonnell |
| 3,425,700 A | * | 2/1969 | Edwards |
| 5,119,001 A | * | 6/1992 | Moore et al. |
| 5,941,196 A | * | 8/1999 | Domanski .................... 119/708 |

* cited by examiner

*Primary Examiner*—Thomas Price
(74) *Attorney, Agent, or Firm*—Sughrue Mion, PLLC

(57) ABSTRACT

A toy for pets, which is designed to encourage sedentary pets to exercise by attracting them to the chaotic movement of a movable object, is provided. The toy for animals includes a rotating unit, which is provided so as to allow the axis of rotation to be angled with respect to the vertical direction; a first rod having a base portion connected coaxially with the axis of rotation and a tip portion bent with respect to the base portion; a second rod, which is connected to the tip portion of the first rod and has enough flexibility to be deflected from the longitudinal direction; and a movable object mounted to the tip of the second rod with a string material. The movable object is moved chaotically in the vertical and horizontal directions within a three-dimensional space around the rotating unit by chaotically rotating the axis of rotation of the rotating unit in an arbitrary rotating direction.

6 Claims, 3 Drawing Sheets

TOY FOR ANIMALS

BACKGROUND OF THE INVENTION

1. Field of the Invention

The present invention relates to a toy for animals which is designed to encourage sedentary pets to be active, and more particularly, to a novel improvement to attract pets attention over a long period by chaotically controlling the movement of an amusing movable object.

2. Description of the Related Art

FIG. 3 shows the configuration of a conventional toy for animals.

In FIG. 3, a pedestal 1 has a built-in motor 2 for controlling electrical driving. This motor 2 has a rotary shaft 2A arranged in a vertical direction. Additionally, a flexible rod 3 which is 10 to 30 cm long is connected to this rotary shaft 2A. The rod 3 is bent nearly at a right angle, and is provided with a movable object 4 in the shape of, for example, a mouse at the tip thereof.

Moreover, in order to make the apparent movement of the movable object 4 complex, the rod 3 is constituted of a rigid material at a base portion and a flexible material at a tip portion thereof, depending on the toy.

In such a conventional toy for pets, when the motor 2 is rotated, the movable object 4 rotates on a plane where the pedestal 1 is installed. Thus, animals such as cats show interest and chase the movable object 4, thus allowing sedentary pets to exercise without human assistance.

With the above-noted configuration, the conventional toy has the following problems. Specifically, since the movement of the movable object 4 is limited to the range on the plane where the pedestal 1 is installed, the movement is only two-dimensional and is unlikely to repeatedly attract the attention animals over a long period.

Moreover, the rotation of the movable object 4 has a pattern, so that pets quickly lose interest.

Further, even if the movable object 4 is rotated chaotically, the movement of the movable object 4 is only two-dimensional as mentioned above, and thus will not attract animals repeatedly or over a long period. The method of providing chaotic movement to the movable object 4 is also unclear.

SUMMARY OF THE INVENTION

It is therefore an object of the present invention to provide a toy for animals that can sufficiently amuse pets by achieving three-dimensional and chaotic movement of a movable object, thus solving the above-noted problems.

The toy for animals of the present invention includes a rotating unit, which is provided so as to allow an axis of rotation to be angled with respect to the vertical direction; a first rod having a base portion connected coaxially with the axis of rotation and a tip portion bent with respect to the base portion; a second rod, which is connected to the tip portion of the first rod and has enough flexibility to be deflected from the longitudinal direction; and a movable object mounted to the tip of the second rod with a string material, and is controlled so that the movable object is moved chaotically in the vertical and horizontal directions within a three-dimensional space around the rotating unit by chaotically rotating the axis of rotation of the rotating unit in an arbitrary rotating direction. Moreover, the rotating unit may be provided so as to allow the axis of rotation to have an elevation angle of 45° to 80° with respect to the horizontal direction. The first rod may also be bent so as to to be angled of 150° to 170° between the tip portion and the base portion. Additionally, the chaotic rotation of the rotating unit may be achieved by dividing signal levels of an original signal into a first area, a second area and a third area so as to convert the original signal into digital data, and using chaos data in which the digital data is converted so as to make a left rotation, a stop and a right rotation when the signal level of the original signal is in the first area, the second area and the third area, respectively. Moreover, the second area may have a width of 100 to 700 ms. Furthermore, the toy for animals may further include a pedestal having an angle adjusting arm, and the rotating unit may be built in a housing which is mounted on the tip of the arm.

DESCRIPTION OF THE PREFERRED EMBODIMENT

Figure 1:
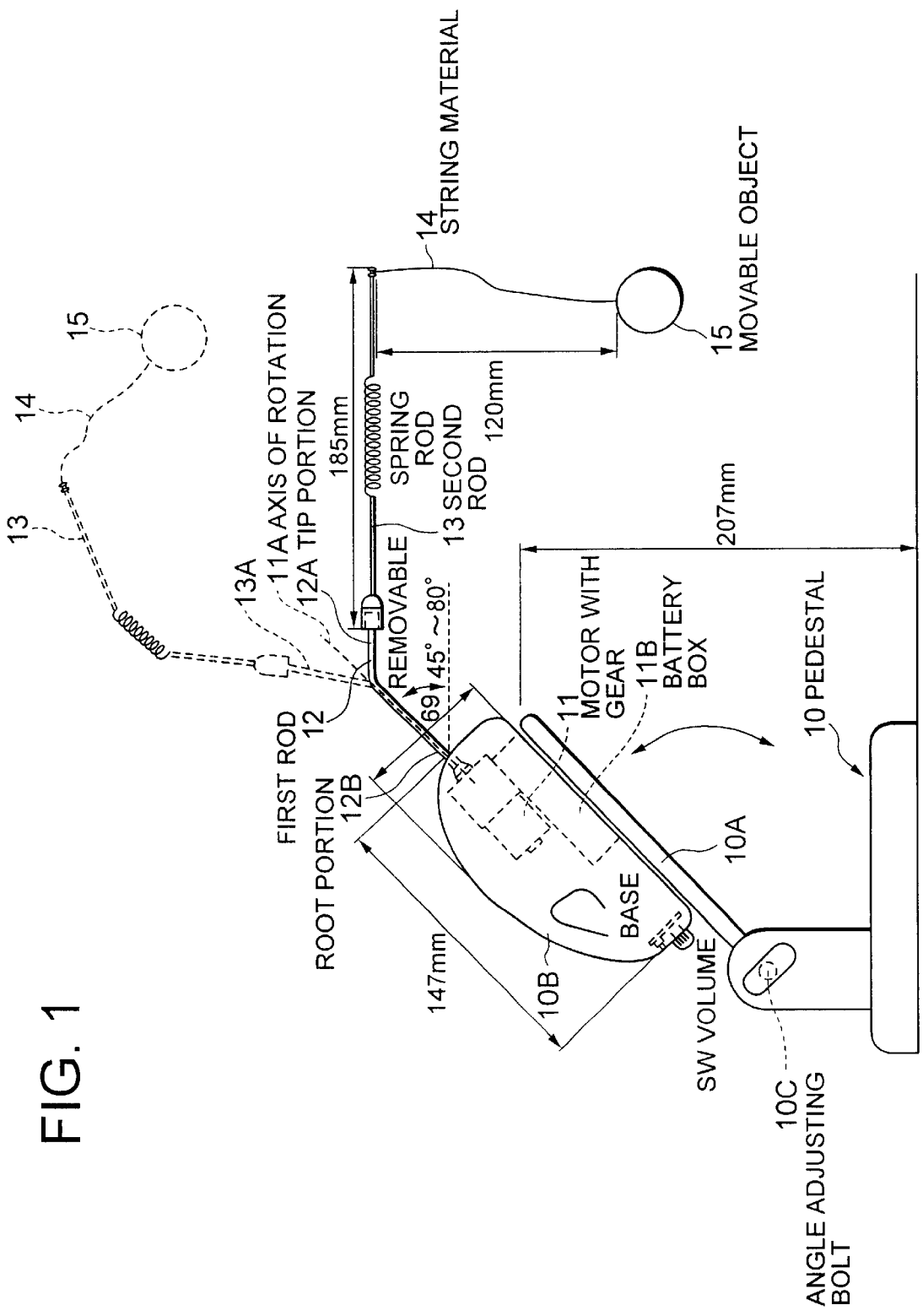
FIG. 1 is a structural view, schematically showing a toy for animals according to the present invention.

A preferred embodiment of the toy for animals according to the present invention will be explained in detail along with the drawings.

Additionally, the same reference numerals are used for the same or equivalent parts as those of the conventional toy, and the explanation thereof is omitted.

As shown in FIG. 1, the toy for animals of the present invention has a pedestal 10 in the form of a stand. To an arm 10A of this pedestal 10, a housing 10B that has a built-in motor 11 and battery box 11B is mounted, and the angle of the arm 10A is arbitrarily adjustable by an angle adjusting bolt 10C.

Specifically, an axis of rotation 11A of the motor 11 is provided so as to to be angled relative to the vertical direction. The elevation angle of the axis of rotation 11A relative to the horizontal direction is preferably between 45° and 80°.

Moreover, a rigid first rod 12 is connected coaxially with the axis of rotation 11A. A tip portion 12A of this first rod 12 is bent so as to to be angled with respect to a base portion 12B. The angle between the tip portion 12A and the root portion 12B is preferably 150° to 170°.

Additionally, the battery box 11B is mounted to the motor 11 which performs the chaotic driving control described later.

To the tip portion 12A of the first rod 12, a second rod 13 is connected that has flexibility enough to be freely deflected from the longitudinal direction thereof. To the tip of the second rod 13, a movable object 15 is attached with a string material 14 such as a fishing line. When the toy of the present invention is used for, cats, for instance, this movable object 15 may be an object having a similar shape, pattern, color and so forth as a mouse, or ribbons, or the like that cats like.

FIG. 1 shows a spring rod having a spring in the middle as an example of the second rod 13. However, the second rod 13 may be a flexible rod material that can be deflected from the longitudinal direction and is not limited to one having a spring in the middle. The sizes in FIG. 1 are examples.

In such a rotation mechanism, the movable object 15 moves in the horizontal and vertical directions within the three-dimensional space surrounding the motor 11 (see dashed-line section in FIG. 1) when the rotary shaft 11A of the motor 11 is rotated. This is because the rotary shaft 11A is angled with respect to the vertical direction, and the first rod 12 is bent.

Next, the rotation of the motor 11 will be explained.

The toy for animals of the present invention chaotically drives the motor 11 by using a microchip in which chaos data is stored.

This chaotic drive control performs drive control by the motion of deterministic chaos. The drive control of the motor 11 is based on, for instance, chaos data obtained from various chaotic phenomena in nature such as the murmurs of a stream, the strength of wind blowing through a field and movement of breaking waves on the ocean, artificial chaos data based on other actual data or formulas, and so forth.

Chaos data for use in the chaotic drive control is prepared by carrying out the following procedure on original signals.

Figure 2:
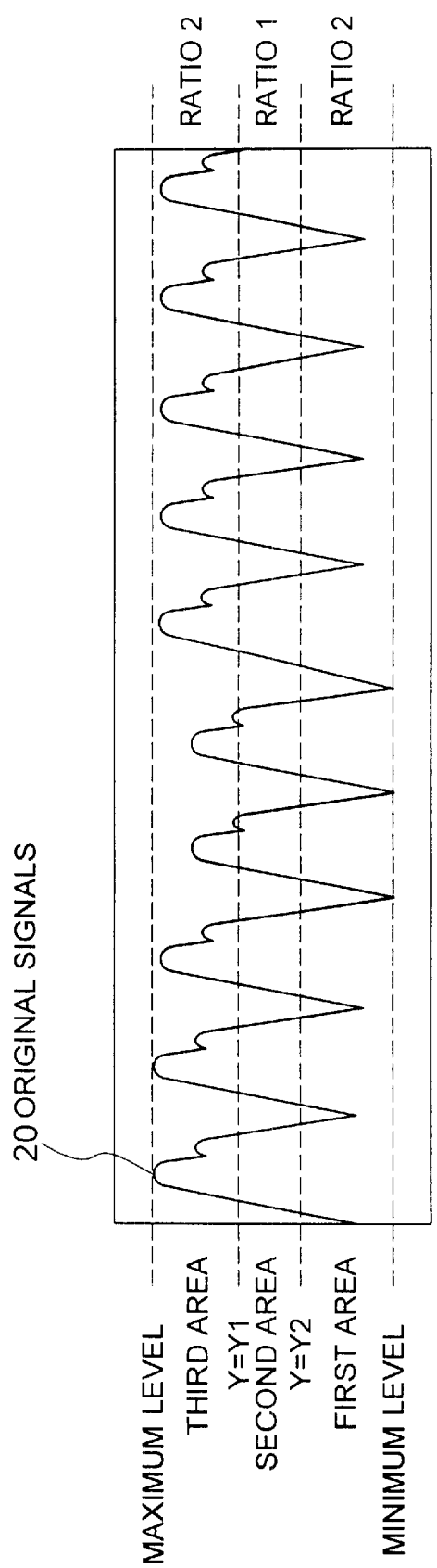
FIG. 2 is a characteristic diagram, showing the principle of extracting chaos data for use in the toy for animals of the present invention.
Figure 3:
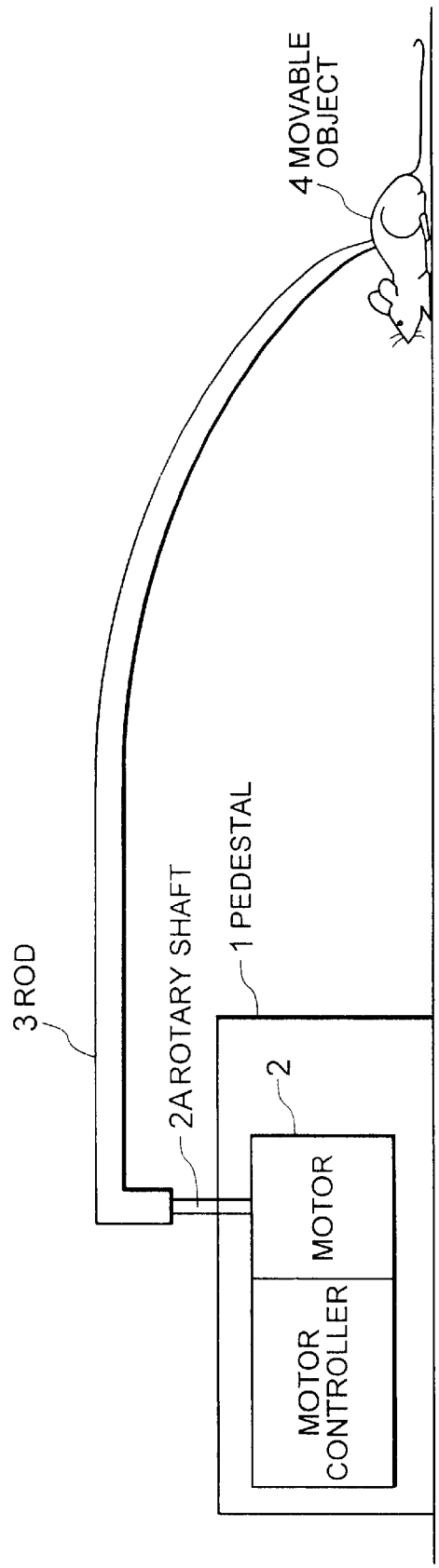
FIG. 3 is a structural view, schematically showing a conventional toy for animals.

FIG. 2 is a characteristic diagram showing the procedural steps to obtain chaos data from original signals.

For instance, a human pulse is used as an original signal 20. This original signal 20 is read by a computer in a data format such as a PCM format or a text format. The original signal 20, read thereby, is analog data which expresses time-serial signal levels of the original signal 20.

The vertical axis in FIG. 2 indicates the signal level of pulses, which are used as the original signal 20, and the horizontal axis indicates time.

Two straight lines Y=Y1 and Y=Y2 are drawn parallel to the horizontal axis, and the original signal 20 is divided into three areas, first, second and third areas, from the low signal level.

Various chaos data, based on the original signal 20 such as pulses, are obtained by determining the signal level of the original signal 20 in the first area, the second area and the third area as "right rotation", "stop" and "left rotation", respectively.

The digital data, obtained from the first, second and third area of the original signal 20, is assumed to be "0", "1" and "2", respectively. When the digital data is converted into binary numbers, the digital data, "00", "01" and "10", is obtained.

When the motor 11 switches from left rotation to right rotation, there is always a pause. Thus, "1" (="01"), obtained from the second area of the original signal 20 equivalent to the stop motion should be the data to stop the motor 11.

However, in driving the general motor 11, "00" is the data to stop the rotation. Thus, it is necessary to convert the data in the second area equivalent to the stop motion to "00" and the data in the first area to "01", so that the motor 11 is driven with left rotation in the first area, stop in the second area, and right rotation in the third area.

Accordingly, in the toy for animals of the present invention, the chaos data, obtained by such a data conversion, is used to drive the motor 11.

Next, the method of setting the rotation speed in the process of preparing chaos data will be explained below.

The original signal 20, read by a computer in a data format such as a PCM format or text format, is analog data which expresses time-serial signal levels of the original signal 20.

By arbitrarily setting intervals in extracting the time-serially arranged data as chaos data for use in the drive control of the motor 11, the rotation speed of the motor 11 may be arbitrarily changed.

For example, when the chaos data which is used to drive the motor 11 is obtained by extracting the time-serially arranged data per unit time, the motor 11 is driven by the rhythm in which a human pulse or the like is reproduced (in other words, the waveform and period are the same as those of the pulse). Additionally, when the original signal 20 is extracted, for instance, per time period which is five times as brief as the unit time mentioned above, the chaos data is time-compressed, so that the rotation speed of the motor 11 increases.

Accordingly, by adjusting the unit time to extract the time-serially arranged data, the rotation speed of the motor 11 may be adjusted.

Moreover, in order to set the operation time of left rotation, the stop time, and the operation time of right rotation of the motor 11 during the preparation process of the chaos data, the two straight lines (Y=Y1, Y=Y2) in FIG. 2 may be set differently. Specifically, the intervals of "00", "01" and "10" data obtained from the original signal 20 may be changed by arbitrarily selecting the width of the signal level of the first, second and third areas (in the direction of the vertical axis in FIG. 2). As a result, the operation time of left rotation, the stop time, and the operation time of right rotation may be arbitrarily set in terms of chaos data for use in the drive-control of the motor 11.

By the above-mentioned procedure, chaos data may be prepared for use in chaotic drive-control. The chaos data obtained thereby is stored in a microchip, which is built in a driving unit of the motor 11.

According to the toy for animals of the present invention, the motor 11 is driven by using the chaos data obtained by dividing the original signal 20 into three-stages of signal levels. Therefore, the movable object 15 may be chaotically moved by using the chaos data easily prepared thereby, and can sufficiently attract animals to the movable object 15.

Moreover, the movable object 15 can be moved chaotically in the horizontal and vertical directions within the three-dimensional space surrounding the motor 11. Thus, the movement of the movable object 15 becomes realistic, like a living creature such as a mouse, and pets such as cats will play with the toy of the present invention for a long time as if they were chasing a real mouse. Accordingly, sedentary pets such as house cats can get a sufficient level of exercise.

The toy for animals of the present invention includes a rotating unit, which is provided so as to allow an axis of rotation to be angled with respect to the vertical direction; a first rod having a base portion connected coaxially with the axis of rotation and a tip portion bent with respect to the base portion; a second rod, which is connected to the tip portion of the first rod and has enough flexibility to be deflected from the longitudinal direction; and a movable object mounted to the tip of the second rod with a string material. The movable object moves chaotically in the vertical and horizontal directions within a three-dimensional space around the rotating unit by chaotically rotating the rotary shaft of the rotating unit in an arbitrary rotating direction. Therefore, the movement of the movable object 15 becomes realistic, like a living creature such as a mouse, and pets such as cats will play with the toy of the present invention for a long time as if they were chasing a real mouse. Accordingly, sedentary pets such as house cats can obtain a sufficient level of exercise. Additionally, since the rotating unit is provided so as to allow the axis of rotation have an elevation angle of 45° to 80° with respect to the horizontal direction, the three-dimensional movement of the movable object may mimic the movement of a living creature. The first rod is also bent so as to to be angled of 150° to 170° between the tip portion and the base portion, so that the movable object can move realistically like a living creature in three-dimensional space. Additionally, the chaotic rotation of the rotating unit is achieved by dividing signal levels of an original signal into a first area, a second area and a third area so as to convert the original signal into digital data, and using chaos data in which the digital data is converted so as to make a left rotation, a stop and a right rotation when the signal level of the original signal is in the first area, the second area and the third area, respectively. Thus, chaotic drive-control may be achieved by the chaos data that can easily be prepared based on an original signal such as a human pulse. Moreover, the second area has a width of 100 to 700 ms, so that the movement of the movable object may be realistic like a living creature. Furthermore, the toy for animals further includes a pedestal having an adjustable angled arm, and the rotating unit is built in a housing which is mounted on the tip of the arm. Therefore, a toy for animals may be easily and economically provided.

What is claimed is:

1. A toy for animals comprising:

rotating means provided so as to allow an axis of rotation to be angled with respect to the vertical direction;

a first rod having a base portion connected coaxially with the axis of rotation and a tip portion bent with respect to the base portion;

a second rod, which is connected to the tip portion of the first rod and has enough flexibility to be deflected from the longitudinal direction; and a movable object mounted to a tip of the second rod with a string material;

wherein the movable object is moved chaotically in a vertical direction and in a horizontal direction within a three-dimensional space around the rotating means by chaotically rotating the rotary shaft of the rotating means in an arbitrary rotating direction.

2. The toy for animals according to claim 1, wherein the rotating means is provided so as to allow the axis of rotation to have an elevation angle of 45° to 80° with respect to the horizontal direction.

3. The toy for animals according to claim 1, wherein the first rod is bent so as to to be angled of 150° to 170° between the tip portion and the base portion.

4. The toy for animals according to claim 1, wherein chaotic rotation of the rotating means is achieved by dividing signal levels of an original signal into a first area, a second area and a third area so as to convert the original signal to digital data, and using chaos data in which the digital data is converted so as to make a left rotation, a stop and a right rotation when the signal level of the original signal is in the first area, the second area and the third area, respectively.

5. The toy for animals according to claim 4, wherein the second area has a width of 100 to 700 ms.

6. The toy for animals according to claim 1, further comprising a pedestal having an adjustable angled arm, wherein the rotating means is built in a housing which is mounted on a tip of the arm.

* * * * *